(12) United States Patent
Watanabe

(10) Patent No.: US 11,579,596 B2
(45) Date of Patent: Feb. 14, 2023

(54) PLANT MONITORING APPARATUS, PLANT MONITORING METHOD, AND COMPUTER READABLE RECORDING MEDIUM

(71) Applicant: NEC Corporation, Tokyo (JP)

(72) Inventor: Masafumi Watanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/262,561

(22) PCT Filed: Jul. 26, 2018

(86) PCT No.: PCT/JP2018/028147
§ 371 (c)(1),
(2) Date: Jan. 22, 2021

(87) PCT Pub. No.: WO2020/021685
PCT Pub. Date: Jan. 30, 2020

(65) Prior Publication Data
US 2021/0286344 A1 Sep. 16, 2021

(51) Int. Cl.
*G05B 19/418* (2006.01)
(52) U.S. Cl.
CPC ..... *G05B 19/4185* (2013.01); *G05B 19/4183* (2013.01); *G05B 19/41865* (2013.01)
(58) Field of Classification Search
CPC .................................................. G05B 19/41
USPC ............................................................ 700/97
See application file for complete search history.

(56) References Cited

U.S. PATENT DOCUMENTS

2018/0004181 A1  1/2018 Ueda et al.
2018/0348728 A1* 12/2018 Ota .......................... G06F 17/15

FOREIGN PATENT DOCUMENTS

| EP | 3316053 A1 * | 5/2018 | ......... G05B 19/0426 |
| EP | 3410245 A1 * | 12/2018 | ........... G05B 19/042 |
| JP | H07-302393 A | 11/1995 | |
| JP | H09-288512 | * 11/1997 | |
| JP | 2001-100835 | * 4/2001 | |
| JP | 2005-044316 A | 2/2005 | |
| JP | 2011-060012 A | 3/2011 | |

(Continued)

OTHER PUBLICATIONS

International Search Report for PCT Application No. PCT/JP2018/028147, dated Oct. 23, 2018. English translation of this report was filed on Apr. 6, 2021 (7 pages).

(Continued)

*Primary Examiner* — Hien D Khuu
(74) *Attorney, Agent, or Firm* — Sughrue Mion, PLLC

(57) ABSTRACT

In order to monitor the operational status of a plant, a plant monitoring apparatus 10 includes: a control program acquisition unit 11 configured to acquire a control program for controlling the plant on the basis of sensor data from a sensor installed in the plant; a causal relationship extraction unit 12 configured to extract, from the control program, causal relationships between a plurality of signals that are used in the plant; a causal relationship specification unit 13 configured to specify the current state of the plurality of signals and compare the specified state and the extracted causal relationships to specify a causal relationship corresponding to the specified state; and a display unit 14 configured to display the specified causal relationship on a screen.

6 Claims, 17 Drawing Sheets

(56) References Cited

FOREIGN PATENT DOCUMENTS

| JP | 2013161216 A | * | 8/2013 | ......... G05B 23/0213 |
| JP | 2017188115 A | * | 10/2017 | ............ G05B 19/05 |
| JP | 2018-005453 A | | 1/2018 | |
| WO | WO-2015198256 A2 | * | 12/2015 | ............ G05B 17/02 |
| WO | WO-2017104401 A1 | * | 6/2017 | ......... G05B 19/0423 |

OTHER PUBLICATIONS

English translation of Written opinion for PCT Application No. JP2018/028147, dated Oct. 23, 2018.

* cited by examiner

Fig.5

CONTROL PROGRAM (PLC1)

```
001: IF TT_1.AL AND NOT V_1.Status AND NOT V_2.Status AND V_3.Status THEN
002:     HA_1.Cmd := 1
003: ELSE
004:     HA_1.Cmd := 0
005: END_IF
```

```
001: IF TT_1.AL AND NOT V_1.Status AND NOT V_2.Status AND V_3.Status THEN
002:     HA_1.Cmd := 1
003: ELSE
004:     HA_1.Cmd := 0
005: END_IF
```

| # | TT_1.AL | V_1.Status | V_2.Status | V_3.Status | HA_1.Cmd |
|---|---------|------------|------------|------------|----------|
| 01 | 0 | 0 | 0 | 0 | 0 |
| 02 | 0 | 0 | 0 | 1 | 0 |
| 03 | 0 | 0 | 1 | 0 | 0 |
| 04 | 0 | 0 | 1 | 1 | 0 |
| 05 | 0 | 1 | 0 | 0 | 0 |
| 06 | 0 | 1 | 0 | 1 | 0 |
| 07 | 0 | 1 | 1 | 0 | 0 |
| 08 | 0 | 1 | 1 | 1 | 0 |
| 09 | 1 | 0 | 0 | 0 | 0 |
| 10 | 1 | 0 | 0 | 1 | 1 |
| 11 | 1 | 0 | 1 | 0 | 0 |
| 12 | 1 | 0 | 1 | 1 | 0 |
| 13 | 1 | 1 | 0 | 0 | 0 |
| 14 | 1 | 1 | 0 | 1 | 0 |
| 15 | 1 | 1 | 1 | 0 | 0 |
| 16 | 1 | 1 | 1 | 1 | 0 |

INPUT VARIABLES      OUTPUT VARIABLE

Fig.7

CAUSAL RELATIONSHIPS

| | Input | | | | | | Output |
|---|---|---|---|---|---|---|---|
| | TT_1.AL | TT_1.AH | V_1.Status | V_2.Status | V_3.Status | HA_1.Cmd | HA_1.Cmd |
| R01 | 0 | * | * | * | * | * | 0 |
| R02 | * | * | * | * | 0 | * | 0 |
| R03 | 1 | * | 0 | 0 | 1 | * | 1 |
| R04 | * | * | * | 1 | * | * | 0 |
| R05 | * | * | 1 | * | * | * | 0 |

Fig.8

SYSTEM STATE INFORMATION

| LOCATION | TT_1.AL | TT_1.AH | V_1.Status | V_2.Status | V_3.Status | HA_1.Cmd |
|---|---|---|---|---|---|---|
| PLC1 | 1 | 0 | 0 | 0 | 1 | 1 |
| PLC2 | N/A | N/A | 0 | 0 | 1 | N/A |

Fig.9

PHYSICAL CONFIGURATION INFORMATION

| LOCATION | INPUT/OUTPUT ELEMENT | SOURCE | MIDWAY PATH | DESTINATION |
|---|---|---|---|---|
| PLC1 | TT_1.AL | TT_1 | NW_f1 | * |
| PLC1 | TT_1.AH | TT_1 | NW_f1 | * |
| PLC1 | V_1.Status | V_1 | NW_f2, PLC2, NW_c1 | * |
| PLC1 | V_2.Status | V_2 | NW_f2, PLC2, NW_c1 | * |
| PLC1 | V_3.Status | V_3 | NW_f2, PLC2, NW_c1 | * |
| PLC1 | HA_1.Cmd | PLC1 | NW_f1 | HA_1 |
| PLC2 | V_1.Status | V_1 | NW_f2 | * |
| PLC2 | V_2.Status | V_2 | NW_f2 | * |
| PLC2 | V_3.Status | V_3 | NW_f2 | * |

PLANT MONITORING APPARATUS, PLANT MONITORING METHOD, AND COMPUTER READABLE RECORDING MEDIUM

This application is a National Stage Entry of PCT/JP2018/028147 filed on Jul. 26, 2018, the contents of all of which are incorporated herein by reference, in their entirety.

TECHNICAL FIELD

The present invention relates to a plant monitoring apparatus and a plant monitoring method for monitoring the operational status of a plant, and further relates to a computer readable recording medium that includes recorded thereon a program for realizing the plant monitoring apparatus and the plant monitoring method.

BACKGROUND ART

Conventionally, a control system for controlling the plant is necessary in factories, power plants, substations, sewage plants, etc. Such a control system usually includes a programmable logic controller (PLC), an engineering workstation (management device) for the management and maintenance of the PLC, a terminal device that provides an operator with a human machine interface (HMI), etc.

Among these, the PLC causes an actuator or the like to operate on the basis of sensor data from sensors arranged at different parts of the facility. The PLC operates in accordance with a program provided by the engineering workstation. Furthermore, the operator can monitor the operational status of the facility via the HMI since sensor data values, the operating state of the actuator, and the like are displayed on the HMI.

In addition, in such a facility, the operator needs to quickly discover abnormalities and constantly optimize the facility. Thus, control systems for reducing operator burden are proposed in Patent Documents 1 and 2, for example.

Specifically, the control system disclosed in Patent Document 1 determines the emergency level of the abnormality when an abnormality is detected from a plant state quantity (temperature, pressure, flow rate, or the like), specifies, on the basis of the cause of the abnormality and the emergency level, a suitable operation from an operation guide that is prepared in advance and presents the specified operation to the operator.

Also, the control system disclosed in Patent Document 2 acquires sensor data from sensors in time series, and for each sensor, further calculates an index on the basis of a threshold and the time-series sensor data that is acquired, and calculates the replacement timing of the sensor from the calculated index. The control system disclosed in Patent Document 2 then presents the calculated replacement timing of each sensor to the operator.

Incidentally, in recent years, there are cases in which cyberattacks are targeted at the above-described control systems. In a cyberattack, through a man-in-the-middle attack or the like, an attacker tampers with sensor data communicated over a network in a control system, for example. Thus, a PLC ends up causing an actuator or the like to operate on the basis of tampered sensor data, and the entire facility may be consequently exposed to a dangerous situation. Accordingly, if a facility is exposed to a cyberattack, the operator of the facility needs to take a suitable countermeasure against the cyberattack quickly.

LIST OF RELATED ART DOCUMENTS

Patent Document

Patent Document 1: Japanese Patent Laid-Open Publication No. H7-302393
Patent Document 2: Japanese Patent Laid-Open Publication No. 2011-60012

SUMMARY OF INVENTION

Problems to be Solved by the Invention

However, while the control system disclosed in Patent Document 1 described above can detect a system abnormality on the basis of a plant state quantity, the control system does not assist determining whether the detected abnormality was caused by a cyberattack. Thus, even if the control system disclosed in Patent Document 1 is introduced, the operator cannot take a suitable countermeasure against the cyberattack quickly, and this may result in increased damage. In addition, the system disclosed in Patent Document 2 has the problem of not being capable of handling cyberattacks at all.

Furthermore, it can be considered that, in a case in which an abnormality is detected by the control system disclosed in Patent Document 1, the cause of the abnormality could be found and a countermeasure against the cyberattack could be taken if the operator refers to a manual including description of a list of control rules and analyzes PLC control logics.

However, PLC control logics are so complicated that an operator cannot give an immediate answer as to which input values serve as the basis for causing a specific actuator to operate, and the analysis would take time even if a manual is referred to, for example. It is difficult to handle a cyberattack in such a manner since no time could be wasted in the case of a cyberattack, and it is difficult to secure enough time to refer to a manual.

An example object of the invention is to provide a plant monitoring apparatus, a plant monitoring method, and a computer readable recording medium that eliminate the above-described problems and that present a causal relationship included in a control program so that an operator could take a countermeasure quickly in a case in which an abnormality occurs in a plant.

Means for Solving the Problems

In order to achieve the above-described object, a plant monitoring apparatus according to an example aspect of the invention is an apparatus for monitoring the operational status of a plant, and includes:
a control program acquisition unit configured to acquire a control program for controlling the plant on the basis of sensor data from a sensor installed in the plant;
a causal relationship extraction unit configured to extract, from the acquired control program, causal relationships between a plurality of signals that are used in the plant;
a causal relationship specification unit configured to compare the current state of the plurality of signals and each of the extracted causal relationships to specify a causal relationship corresponding to the current state; and
a display unit configured to display the specified causal relationship on a screen.

In addition, in order to achieve the above-described object, a plant monitoring method according to an example aspect of the invention is a method for monitoring the operational status of a plant, and includes:

(a) a step of acquiring a control program for controlling the plant on the basis of sensor data from a sensor installed in the plant;

(b) a step of extracting, from the acquired control program, causal relationships between a plurality of signals that are used in the plant;

(c) a step of comparing the current state of the plurality of signals and each of the extracted causal relationships to specify a causal relationship corresponding to the current state; and (d) a step of displaying the specified causal relationship on a screen.

Furthermore, in order to achieve the above-described object, a computer readable recording medium according to an example aspect of the invention is a computer readable recording medium that includes recorded thereon a program for monitoring the operational status of a plant by means of a computer, the program including instructions that cause the computer to carry out (a) a step of acquiring a control program for controlling the plant on the basis of sensor data from a sensor installed in the plant;

(b) a step of extracting, from the acquired control program, causal relationships between a plurality of signals that are used in the plant;

(c) a step of comparing the current state of the plurality of signals and each of the extracted causal relationships to specify a causal relationship corresponding to the current state; and (d) a step of displaying the specified causal relationship on a screen.

Advantageous Effects of the Invention

As described above, according to the invention, a causal relationship included in a control program is presented so that an operator could take a countermeasure quickly in a case in which an abnormality occurs in a plant.

BRIEF DESCRIPTION OF THE DRAWINGS

FIG. 5 shows one example of a control program that is used in the example embodiment of the invention.

FIG. 7 is a diagram illustrating causal relationships extracted on the basis of results of the analysis processing illustrated in FIG. 6.

FIG. 8 is a diagram illustrating one example of system state information acquired in the example embodiment of the invention.

FIG. 9 is a diagram illustrating one example of physical configuration information used in the example embodiment of the invention.

EXAMPLE EMBODIMENT

Example Embodiment

In the following, a plant monitoring apparatus, a plant monitoring method, and a program in an example embodiment of the invention will be described with reference to FIGS. 1 to 17.

[Apparatus Configuration]

Figure 1:
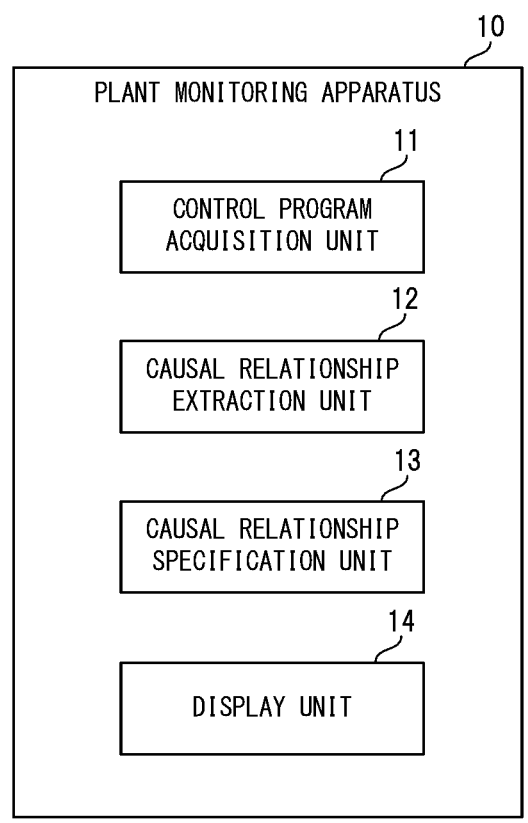
FIG. 1 is a block diagram illustrating a schematic configuration of a plant monitoring apparatus in an example embodiment of the invention.

First, a schematic configuration of the plant monitoring apparatus in the present example embodiment will be described with reference to FIG. 1. FIG. 1 is a block diagram illustrating the schematic configuration of the plant monitoring apparatus in the example embodiment of the invention.

A plant monitoring apparatus 10 in the present example embodiment, which is illustrated in FIG. 1, is an apparatus for monitoring the operational status of a plant to be monitored. As illustrated in FIG. 1, the plant monitoring apparatus 10 includes a control program acquisition unit 11, a causal relationship extraction unit 12, a causal relationship specification unit 13, and a display unit 14.

The control program acquisition unit 11 acquires a control program for controlling the plant on the basis of sensor data from a sensor installed in the plant. The causal relationship extraction unit 12 extracts, from the control program acquired by the control program acquisition unit 11, causal relationships between a plurality of signals that are used in the plant.

The causal relationship specification unit 13 compares the current state of the plurality of signals and each of the extracted causal relationships to specify a causal relationship corresponding to the current state. The display unit 14 displays the specified causal relationship on a screen.

In such a manner, the plant monitoring apparatus 10 specifies a causal relationship between signals for signals that are currently used in a currently operating plant, and displays the specified causal relationship on a screen. Thus, according to the plant monitoring apparatus 10, in a case in which an abnormality, such as the continuance of an abnormal operation state of an actuator, occurs in the plant, an operator can immediately ascertain a causal relationship of signals in which the abnormality occurred, and can take a countermeasure quickly.

Figure 2:
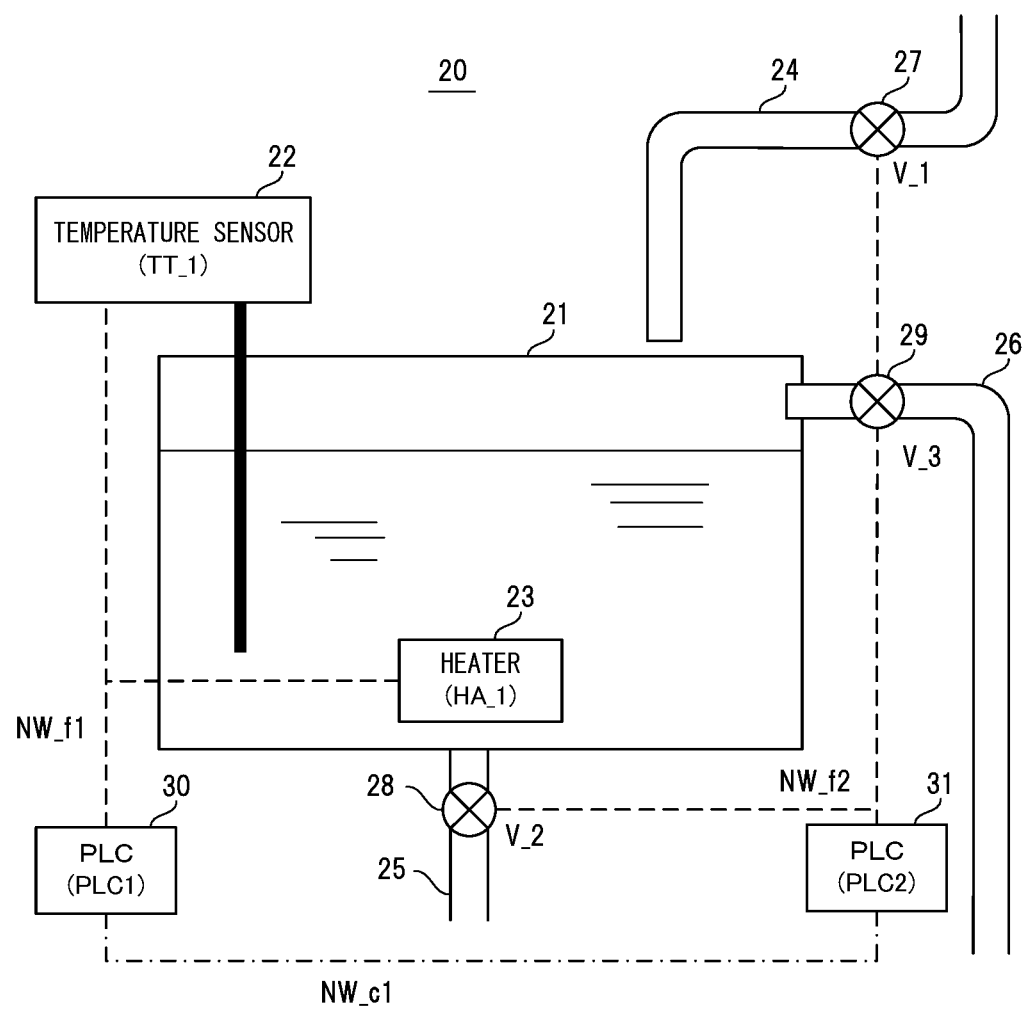
FIG. 2 is a configuration diagram illustrating one example of a configuration of a plant to be monitored in the example embodiment of the invention.
Figure 3:
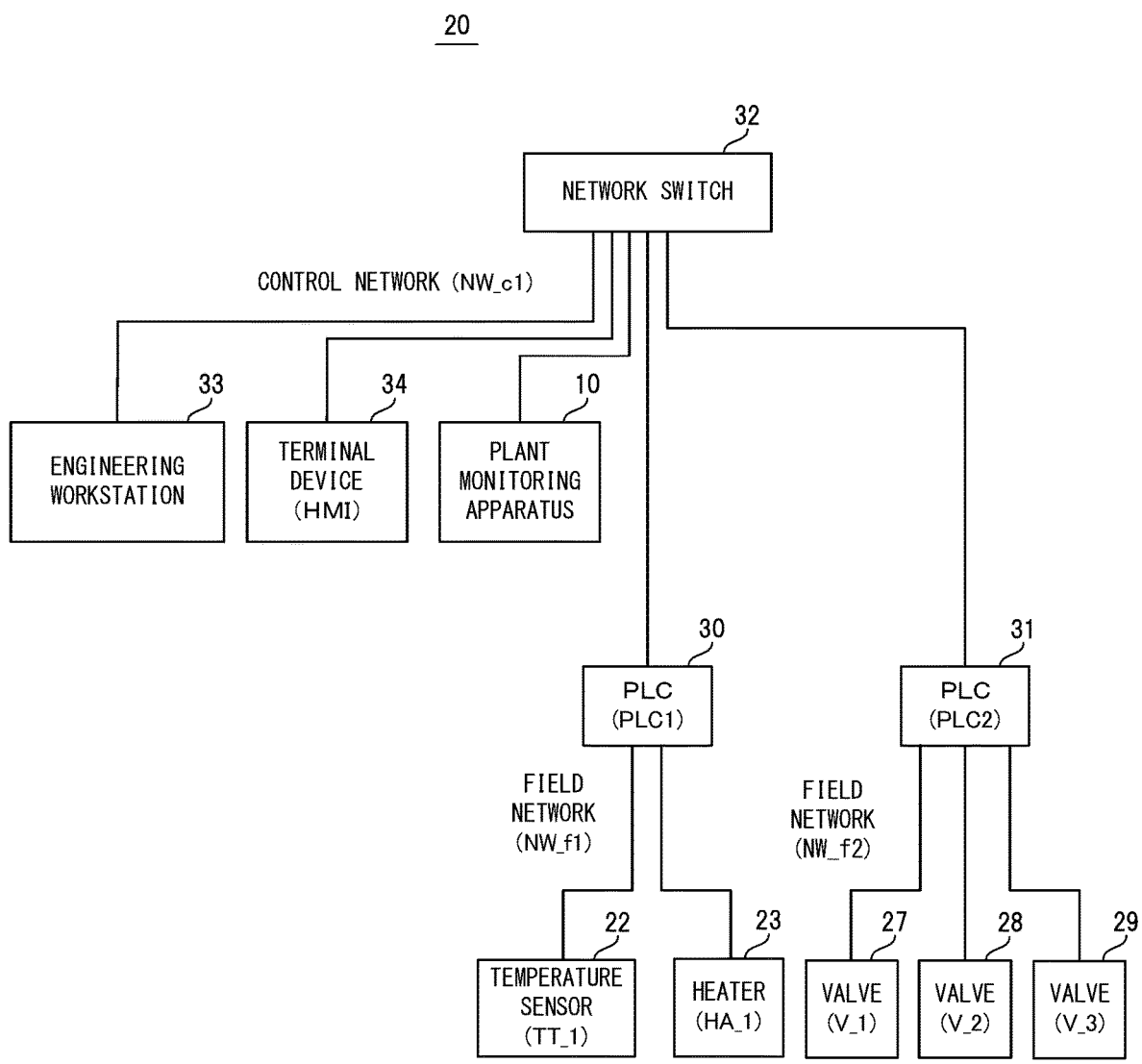
FIG. 3 is a block diagram illustrating a relationship between the plant monitoring apparatus in the example embodiment of the invention and a control system of the plant illustrated in FIG. 2.
Figure 4:
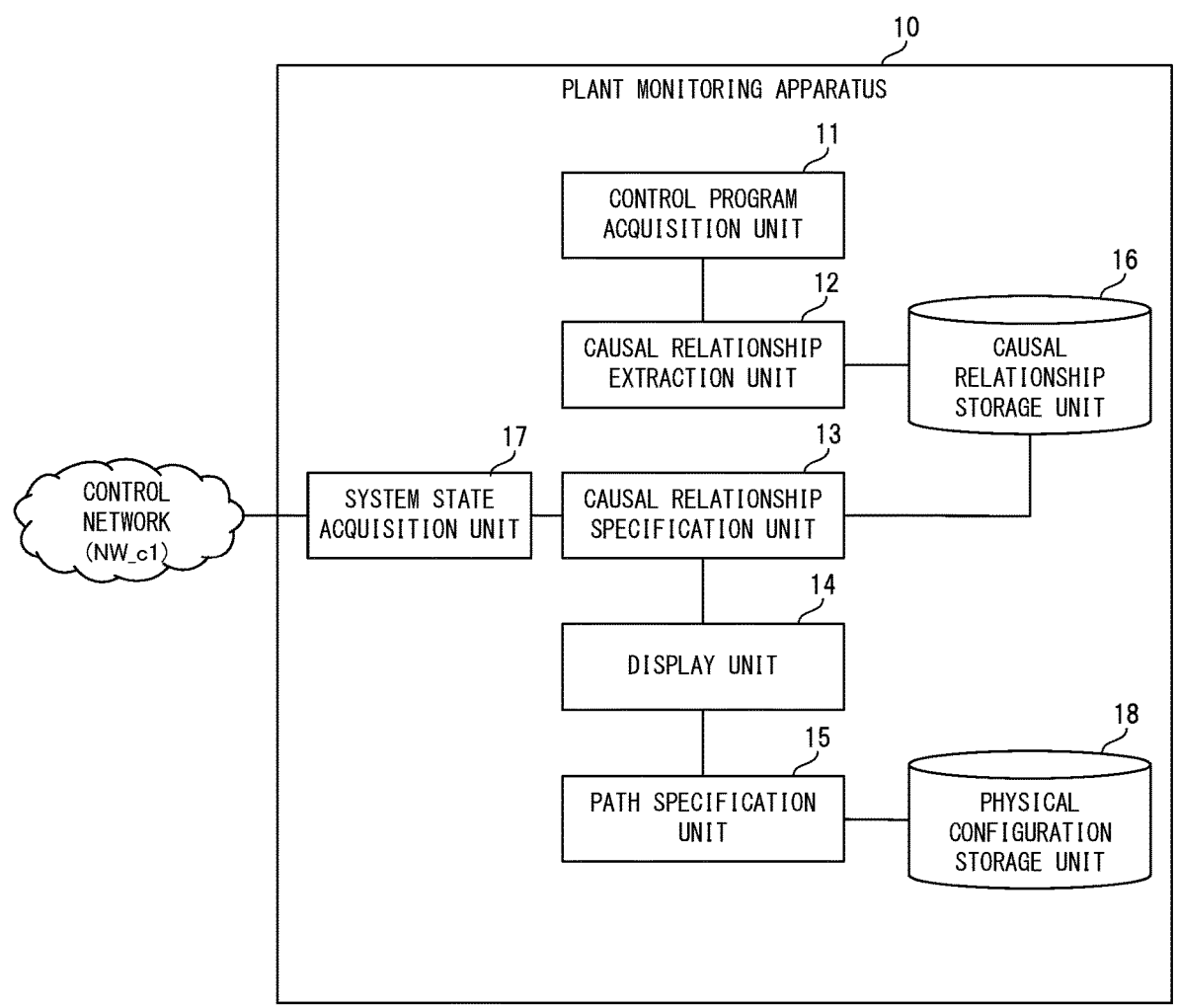
FIG. 4 is a block diagram specifically illustrating the configuration of the plant monitoring apparatus in the example embodiment of the invention.

Next, the configuration and functions of the plant monitoring apparatus in the present example embodiment will be specifically described with reference to FIGS. 2 to 9. FIG. 2 is a configuration diagram illustrating one example of a configuration of the plant to be monitored in the example embodiment of the invention. FIG. 3 is a block diagram illustrating a relationship between the plant monitoring apparatus in the example embodiment of the invention and a control system of the plant illustrated in FIG. 2. FIG. 4 is a block diagram specifically illustrating the configuration of the plant monitoring apparatus in the example embodiment of the invention.

As illustrated in FIG. 2, in the present example embodiment, a plant 20 includes a water storage tank 21, a temperature sensor 22, a heater 23, a feed line 24, a lower drain line 25, an upper drain line 26, and valves 27 to 29. In addition, the plant 20 includes, as control devices, a PLC (PLC1) 30 and a PLC (PLC2) 31 that execute control programs.

The temperature sensor 22 measures the temperature of water stored in the water storage tank 21, and outputs sensor data corresponding to the measured temperature. The heater 23 is arranged so as to be capable of heating the water stored in the water storage tank 21. The PLC 30 causes the heater 23 to operate in accordance with the sensor data output from the temperature sensor 22, and adjusts the temperature of the water.

Furthermore, the feed line 24 is a line for feeding water into the water storage tank 21. A valve 27 is disposed on the feed line 24. The lower drain line 25 is a line for draining water from the lower part of the water storage tank 21. A valve 28 is disposed on the lower drain line 25. The upper drain line 26 is a line for draining water that overflows from the upper part of the water storage tank 21. A valve 29 is disposed on the upper drain line 26. The PLC 31 controls opening and closing of the valve 27, the valve 28, and the valve 29.

In addition, in the plant 20, the PLC 30 and the PLC 31 are connected, via a network switch 32 and a control network (NW_c1), to an engineering workstation 33 and a terminal device 34 used by an operator, so that the PLC 30 and the PLC 31 can perform data communication with the engineering workstation 33 and the terminal device 34, as illustrated in FIG. 3. Furthermore, the PLC 30 and the PLC 31 are also connected to the plant monitoring apparatus 10 via the network switch 32 and the control network (NW_c1).

The terminal device 34 provides the operator with a HMI. The operator performs operations on the HMI of the terminal device 31. The engineering workstation 33 manages the operation states of the PLCs, and further stores control programs for the PLCs. In addition, the engineering workstation 33 updates the control programs in accordance with instructions from the operator or the like.

Furthermore, the PLC 30 is connected to the temperature sensor 22 and the heater 23 via a field network (NW_f1), as illustrated in FIG. 3. In addition, the PLC 31 is connected to the valves 27 to 29 via a field network (NW_f2). In such a manner, the plant 20 to be monitored in the present example embodiment includes a plurality of PLCs that execute control programs, and networks connecting the PLCs and the other devices.

Furthermore, the configuration of the plant monitoring apparatus 10 in the present example embodiment will be specifically described with reference to FIG. 4. As illustrated in FIG. 4, the plant monitoring apparatus 10 includes a path specification unit 15, a causal relationship storage unit 16, a system state acquisition unit 17, and a physical configuration storage unit 18 in addition to the configurations illustrated in FIG. 1.

Since the plant 20 to be monitored includes a plurality of PLCs in the present example embodiment, the control program acquisition unit 11 acquires a control program for each PLC. Furthermore, in the present example embodiment, the control programs are stored by the engineering workstation 33 illustrated in FIG. 2, as mentioned above. Thus, the control program acquisition unit 11 acquires the control programs (see FIG. 5) from the engineering workstation 33.

FIG. 5 shows one example of a control program that is used in the example embodiment of the invention. Furthermore, the control program illustrated in FIG. 5 is a control program for the PLC 30. In FIG. 5, "TT_1. AL", "TT_1. AH", "V_1. Status", "V_2. Status", "V_3. Status", and "HA_1. Cmd" each indicate a signal that is used in the plant 20.

Specifically, "TT_1. AL" is a signal that is "High (1)" when the temperature detected by the temperature sensor 22 is lower than or equal to a lower limit, and is otherwise "Low (0)". "TT_1. AH" is a signal that is "High (1)" when the temperature detected by the temperature sensor 22 is higher than or equal to an upper limit, and is otherwise "Low (0)".

Furthermore, "V_1. Status" is a signal that is "High (1)" when the valve 27 is open and is "Low (0)" when the valve 27 is closed. "V_2. Status" is a signal that is "High (1)" when the valve 28 is open and is "Low (0)" when the valve 28 is closed. "V_3. Status" is a signal that is "High (1)" when the valve 29 is open and is "Low (0)" when the valve 29 is closed. "HA_1. Cmd" is a signal that is "High (1)" when the heater 23 is operating and is "Low (0)" when the heater 23 is stopped.

A signal that is for communicating a manufacturing process state or the like and that is received by a PLC from a sensor or the like is written to a location corresponding to the signal in a storage device that the PLC includes. Furthermore, a signal that is for causing an actuator or the like to operate, stop, etc., and that is transmitted by a PLC to an actuator or the like is read from a location corresponding to the signal in the storage device that the PLC includes. A location in a storage device is typically called a variable, a tag, a register, etc., and is called a variable in the present example embodiment. In addition, a variable to which a signal that is received is written is called an input variable, and a variable from which a signal to be transmitted is read is called an output variable.

In the present example embodiment, for each PLC, the causal relationship extraction unit 12 extracts causal relationships from the control program for the PLC, and stores the extracted causal relationships to the causal relationship storage unit 16. For example, the causal relationships indicate based on what input variable values the output variable values output by the PLCs are determined. Furthermore, the causal relationship extraction unit 12 stores the extracted causal relationships in the causal relationship storage unit 16.

Figure 6:
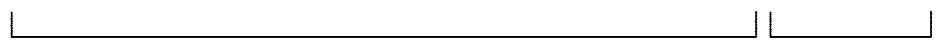
FIG. 6 is a diagram illustrating one example of control program analysis processing that is performed to extract causal relationships in the example embodiment of the invention.

Here, the causal relationship extraction processing performed by the causal relationship extraction unit 12 will be specifically described with reference to FIGS. 6 and 7. FIG. 6 is a diagram illustrating one example of control program analysis processing that is performed to extract causal relationships in the example embodiment of the invention.

FIG. 7 is a diagram illustrating causal relationships extracted on the basis of results of the analysis processing illustrated in FIG. 6.

Specifically, as the analysis processing, the causal relationship extraction unit 12 first specifies an output variable from among variables to and from which writing and reading is performed in the individual processing steps (lines) of a control program (upper part of FIG. 6), as illustrated in FIG. 6. The output variable that is specified is as illustrated in the table in the lower part of FIG. 6.

Next, the causal relationship extraction unit 12 specifies, from the control program, an input variable capable of influencing the determination of the value of the output variable. Furthermore, if there is another input variable capable of influencing the determination of the value of the specified input variable, the causal relationship extraction unit 12 specifies this other input variable as well. Thus, the causal relationship extraction unit 12 recursively executes the specification of an input variable as long as a new input variable is specified.

The specification of an input variable capable of influencing the determination of the value of a given output variable can be carried out in the following manner. For example, if there is an assignment statement that assigns a value to the output variable in the control program, the causal relationship extraction unit 12 specifies, as an input variable, another variable that the assignment statement references as the value to be assigned. Furthermore, in a case in which whether or not the assignment statement is executed is dependent on an evaluation result of a conditional expression, such as an IF statement, in a conditional branch in the control program, the causal relationship extraction unit 12 also specifies, as an input variable, another variable that the conditional expression references.

Next, the causal relationship extraction unit 12 searches the control program for an assignment statement that assigns a constant to the input variable or a conditional expression that compares the input variable and a constant, and determines whether or not the input variable is capable of taking constants on the basis of the assignment statement or conditional expression specified through the search. If the input variable is capable of taking constants, the causal relationship extraction unit 12 specifies the constants (values).

Furthermore, the causal relationship extraction unit 12 comprehensively generates a plurality of input value patterns from the input values specified so far and the constants (values) that the input variables are capable of taking. Next, for each input value pattern, the causal relationship extraction unit 12 executes the control program once in a state in which the control program is given the input value pattern, and calculates an output value. In doing so, the input variables that the control program referenced during execution are also recorded.

The table in the lower part of FIG. 6 illustrates a list of execution results of individual input value patterns (results of the analysis processing). The input variables that the control program referenced during execution are indicated by hatched fields in the table in the lower part of FIG. 6. After executing the control program, the causal relationship extraction unit 12 extracts the recorded input variables, the values of the recorded input variables, and the value of the output variable output by the control program, and sets the extracted information as a causal relationship. Extracted causal relationships are as illustrated in FIG. 7. In the example in FIG. 7, causal relationships R01 to R05 have been extracted.

In such a manner, the causal relationship extraction unit 12 extracts, as causal relationships between the plurality of signals used in the plant, signals that are included in assignment processing and branching conditions in conditional branch processing, and the values of the signals. The causal relationship extraction unit 12 extracts causal relationships through the specification of an output variable, the specification of input variables, the specification of values that the input variables are capable of taking, the generation of input value patterns, and the acquisition of output values and the input variables referenced during the execution of the control program.

The system state acquisition unit 17 repeatedly acquires system state information from the PLCs, the terminal device (HMI) 34, which continuously acquires and has already acquired the system state information, or the like at set intervals, and outputs the acquired system state information to the causal relationship specification unit 13 each time the system state information is acquired. As illustrated in FIG. 8, the system state information is information specifying the current state of each signal in the plant 20. FIG. 8 is a diagram illustrating one example of the system state information acquired in the example embodiment of the invention.

The causal relationship specification unit 13 acquires the system state information (see FIG. 8) output from the system state acquisition unit 17. Furthermore, the causal relationship specification unit 13 compares the current state specified by the system state information and each of the causal relationships (see FIG. 7) stored in the causal relationship storage unit 16, and specifies a causal relationship corresponding to the current state.

The physical configuration storage unit 18 stores physical configuration information. The physical configuration information is information that specifies, for each signal used in the plant, at least the PLC that processes the signal, the source of the signal, and the path that the signal passes through. FIG. 9 is a diagram illustrating one example of the physical configuration information used in the example embodiment of the invention.

Specifically, in the example in FIG. 9, the physical configuration information specifies the location, the source, the midway path, and the destination in regard to each of the signals (input and output elements). Furthermore, the "location" here indicates the locations where the signals are processed, and is mainly specified in terms of the PLCs. The "source" is specified in terms of the physical elements outputting the signals. The "midway path" is specified in terms of the networks, the PLCs, etc., that the signals pass through.

The path specification unit 15 specifies the source and the midway path of each of the plurality of signals included in the causal relationship specified by the causal relationship specification unit 13. Specifically, the path specification unit 15 compares the signals included in the causal relationship and the physical configuration information stored in the physical configuration storage unit 18, and specifies the corresponding source, midway path, and destination for each signal. Furthermore, in the present example embodiment, the path specification unit 15 performs the specification of the source and the midway path of each signal for each PLC.

In the present example embodiment, the display unit 14 displays, on the screen of the terminal device 34 (see FIG. 3), the signals included in the causal relationship specified by the causal relationship specification unit 13, and the sources and midway paths specified by the path specification unit 15, as a causal relationship.

In addition, suppose that a midway path that was specified when the path specification unit 15 performed the specification of the sources and midway paths for each PLC falls under at least one of: a situation in which the specified midway path includes a PLC other than the PLC; and a situation in which the specified midway path includes a specific network. In such a case, the display unit 14 differentiates the display mode of the corresponding signal (the signal whose midway path falls under the above-described situations) from the display mode of the other signals on the basis of an instruction from the path specification unit 15.

[Apparatus Operations]

Figure 10:
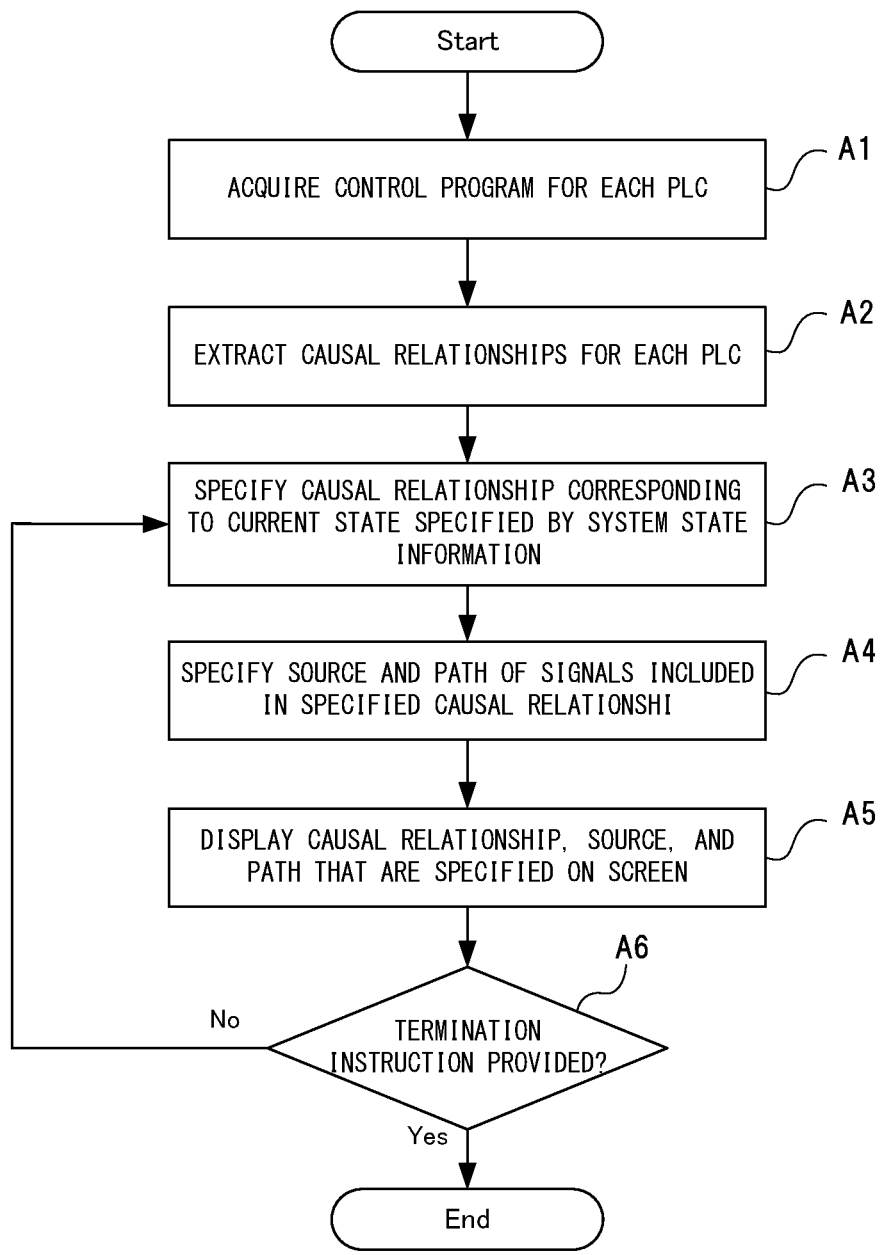
FIG. 10 is a flowchart illustrating operations of the plant monitoring apparatus in the example embodiment of the invention.

Next, the operations of the plant monitoring apparatus 10 in the present example embodiment will be described with reference to FIG. 10. FIG. 10 is a flowchart illustrating the operations of the plant monitoring apparatus in the example embodiment of the invention. FIGS. 1 to 9 will be referred to as needed in the following description. Furthermore, in the present example embodiment, a plant monitoring method is implemented by causing the plant monitoring apparatus to operate. Accordingly, the following description of the operations of the plant monitoring apparatus is substituted for the description of the plant monitoring method in the present example embodiment.

As illustrated in FIG. 10, first, the control program acquisition unit 11 acquires, from the engineering workstation 33, the control program for each PLC of the plant 20 (see FIG. 5 for an example of the control program for the PLC 30) (step A1).

Next, for each PLC, the causal relationship extraction unit 12 extracts, from the control program for the PLC acquired in step A1, causal relationships between the signals used in the plant 20 (step A2).

Specifically, as already described with reference to FIGS. 6 and 7, the causal relationship extraction unit 12 first specifies, from the control program, an input variable capable of influencing the determination of the value of the output variable. Next, the causal relationship extraction unit 12 searches the control program for an assignment statement that assigns a constant to the input variable or a conditional expression that compares the input variable and a constant, and comprehensively generates a plurality of input value patterns from input variables specified through the search and the constants (values) that the input variables are capable of taking. Then, for each input value pattern, the causal relationship extraction unit 12 calculates an output value by executing the control program once in a state in which the control program is given the input value pattern, and in doing so, the causal relationship extraction unit 12 records the input variables that the control program referenced during execution. A causal relationship is expressed by the output value and the input values that are obtained.

Next, the causal relationship specification unit 13 acquires the system state information output from the system state acquisition unit 17. Furthermore, the causal relationship specification unit 13 compares the current state of the signals in the plant 20, which is specified by the system state information, and each of the causal relationships extracted in step A2. In addition, on the basis of the results of the comparison, the causal relationship specification unit 13 specifies a causal relationship that corresponds to the current state (step A3).

Note that, separately from step A3, the system state acquisition unit 17 repeatedly acquires the system state information from the PLCs, the terminal device (HMI) 34, which continuously acquires and has already acquired the system state information, or the like at set intervals, and outputs the acquired system state information to the causal relationship specification unit 13.

Next, the path specification unit 15 specifies the source and the midway path of each of the plurality of signals included in the causal relationship specified by the causal relationship specification unit 13 (step A4). Specifically, the path specification unit 15 compares the signals included in the causal relationship and the physical configuration information stored in the physical configuration storage unit 18, and specifies the corresponding source, midway path, and destination for each signal.

Next, the display unit 14 displays, on the screen of the terminal device (HMI) 34 (see FIG. 3), the signals included in the causal relationship specified by step A3, and the sources and midway paths specified by step A4, as a causal relationship (step A5).

Then, the causal relationship specification unit 13 determines whether or not an instruction to terminate processing is provided (step A6). If it is determined as a result of the determination in step A6 that an instruction to terminate processing is not provided, the causal relationship specification unit 13 executes step A3 once again using the latest system state information. On the other hand, if it is determined as a result of the determination in step A6 that an instruction to terminate processing is provided, the processing in the plant monitoring apparatus 10 is terminated.

Here, with reference to FIGS. 11 to 16, specific examples of causal relationships that are displayed on the screen by the display unit 14 will be described. FIGS. 11 to 16 illustrate examples (first to sixth examples) of a displayed screen in the example embodiment of the invention. Furthermore, unless otherwise stated, FIGS. 11 to 16 each illustrate a case in which the causal relationship specified on the basis of the system state information by the causal relationship specification unit 13 is the causal relationship R03 regarding the PLC 30, which is illustrated in FIG. 7.

Figure 11:
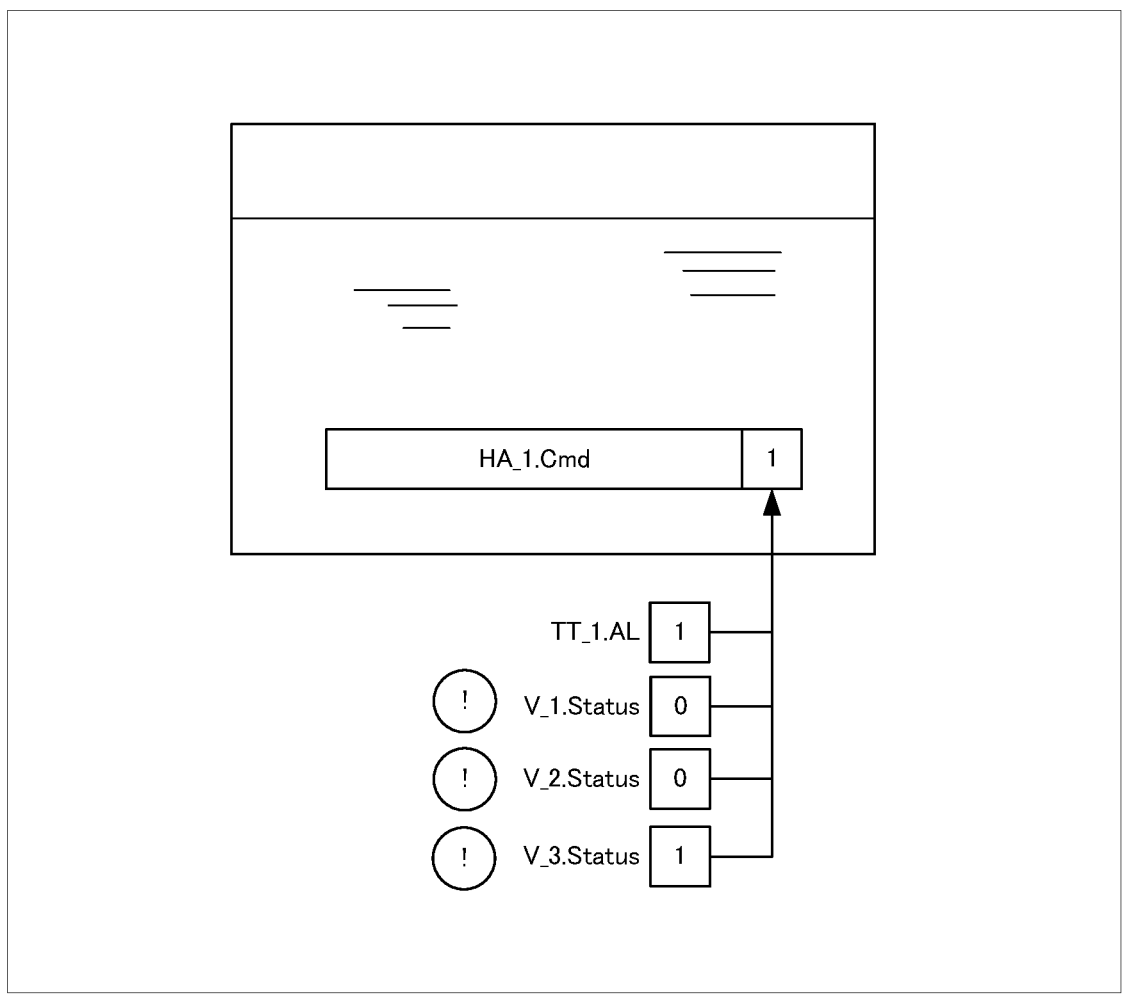
FIG. 11 illustrates a first example of a displayed screen in the example embodiment of the invention.

In the example in FIG. 11, the display unit 14 displays, on the screen, the signals included in the specified causal relationship, i.e., the signals "TT_1. AL", "V_1. Status", "V_2. Status", "V_3. Status", and "HA_1. Cmd", and the values of the signals. Furthermore, with regard to the signals "V_1. Status", "V_2. Status", and "V_3. Status" among these signals, the paths that the signals pass through include the other PLC 31 and a specific control network (NW_c1). Thus, the display unit 14 provides the symbol "!" to the signals "V_1. Status", "V_2. Status", and "V_3. Status" to differentiate the display modes of these signals from the display modes of other signals.

Figure 12:
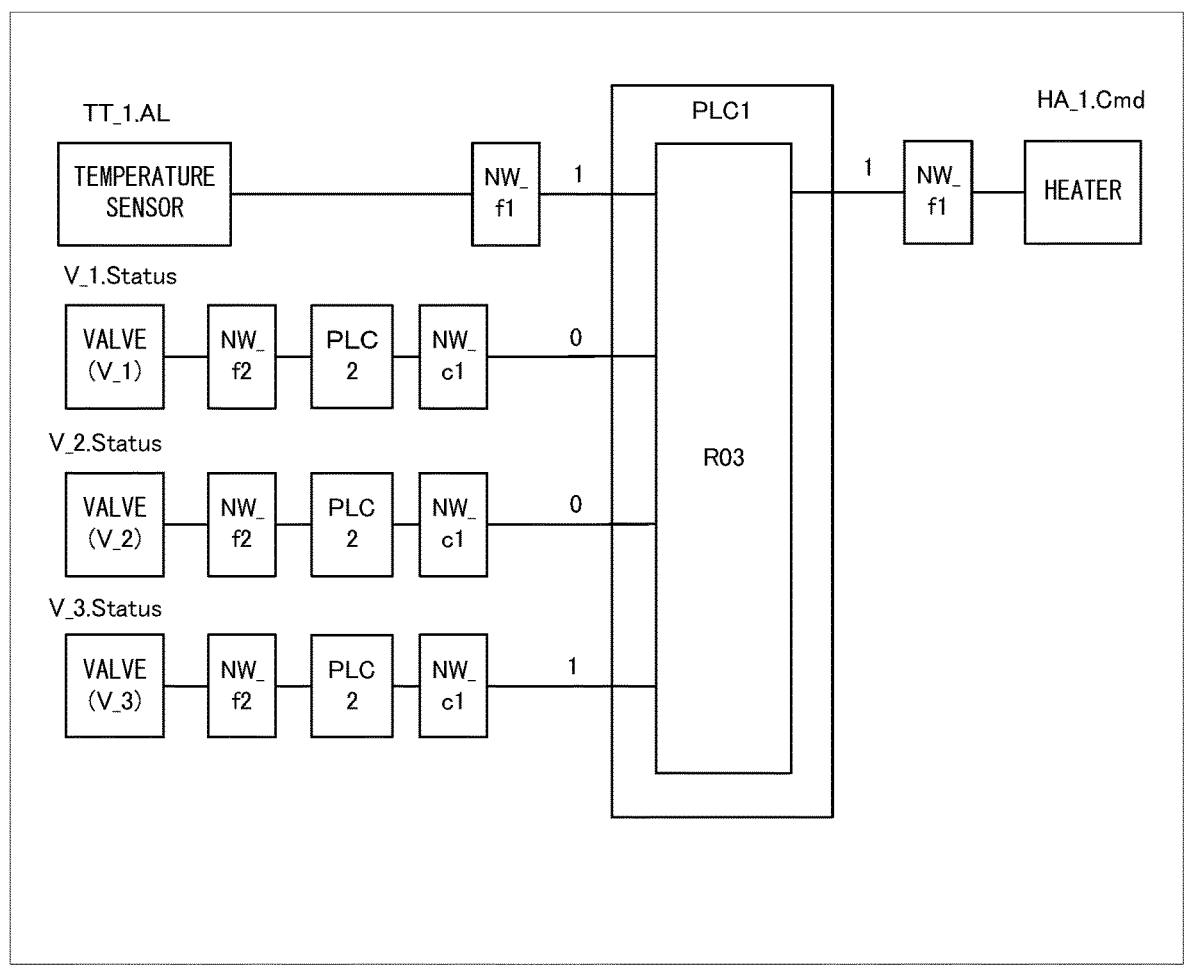
FIG. 12 illustrates a second example of a displayed screen in the example embodiment of the invention.

Also in the example in FIG. 12, the display unit 14 displays, on the screen, the signals "TT_1. AL", "V_1. Status", "V_2. Status", "V_3. Status", and "HA_1. Cmd", and the values of the signals, similarly to the example in FIG. 11. However, in the example in FIG. 12, the display unit 14 also displays the number (identifier) of the causal relationship and the midway paths of the signals along with the signals and values.

Figure 13:
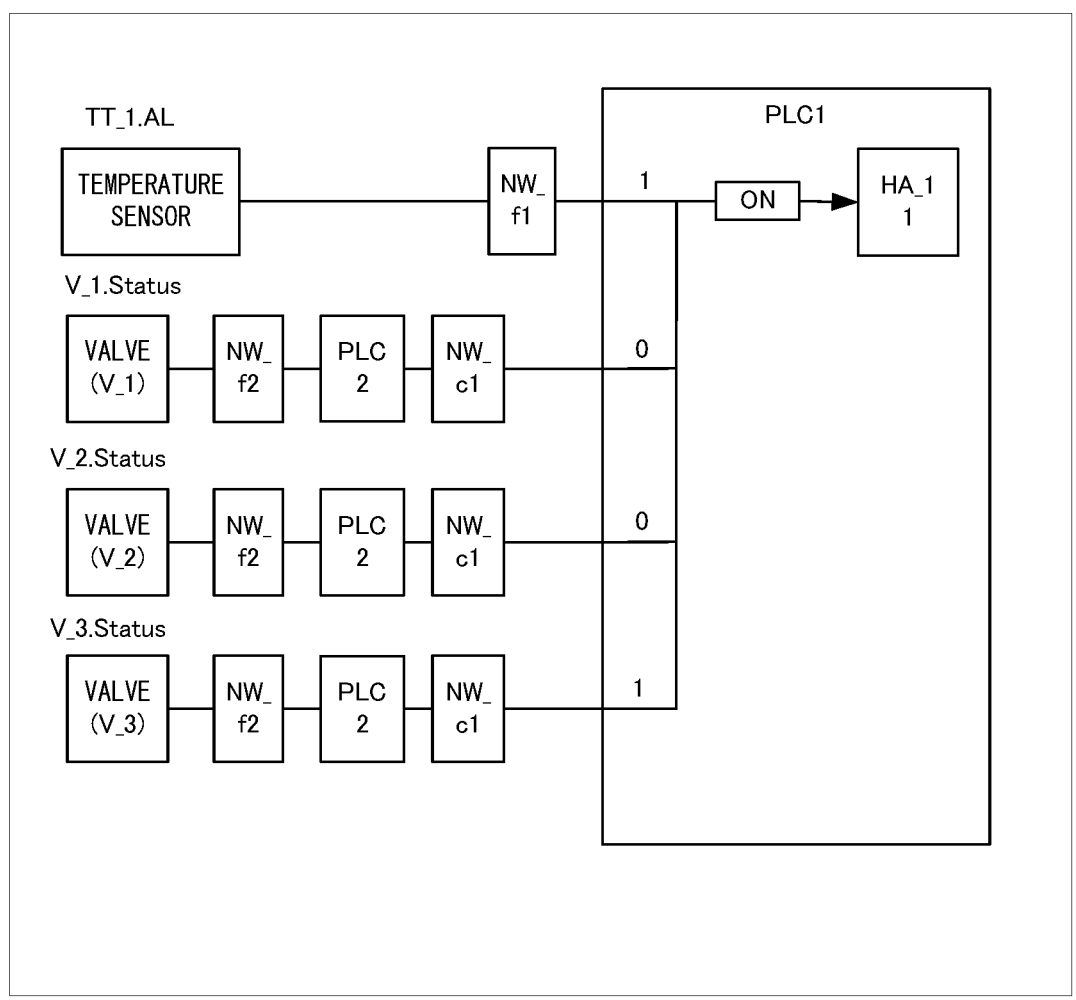
FIG. 13 illustrates a third example of a displayed screen in the example embodiment of the invention.

In the example in FIG. 13, while displaying the midway paths of the signals similarly to the example in FIG. 12, the display unit 14 specifically displays the state of the output element in place of the number of the causal relationship. In FIG. 13, "ON" is displayed to indicate that the heater 23 is operating.

Figure 14:
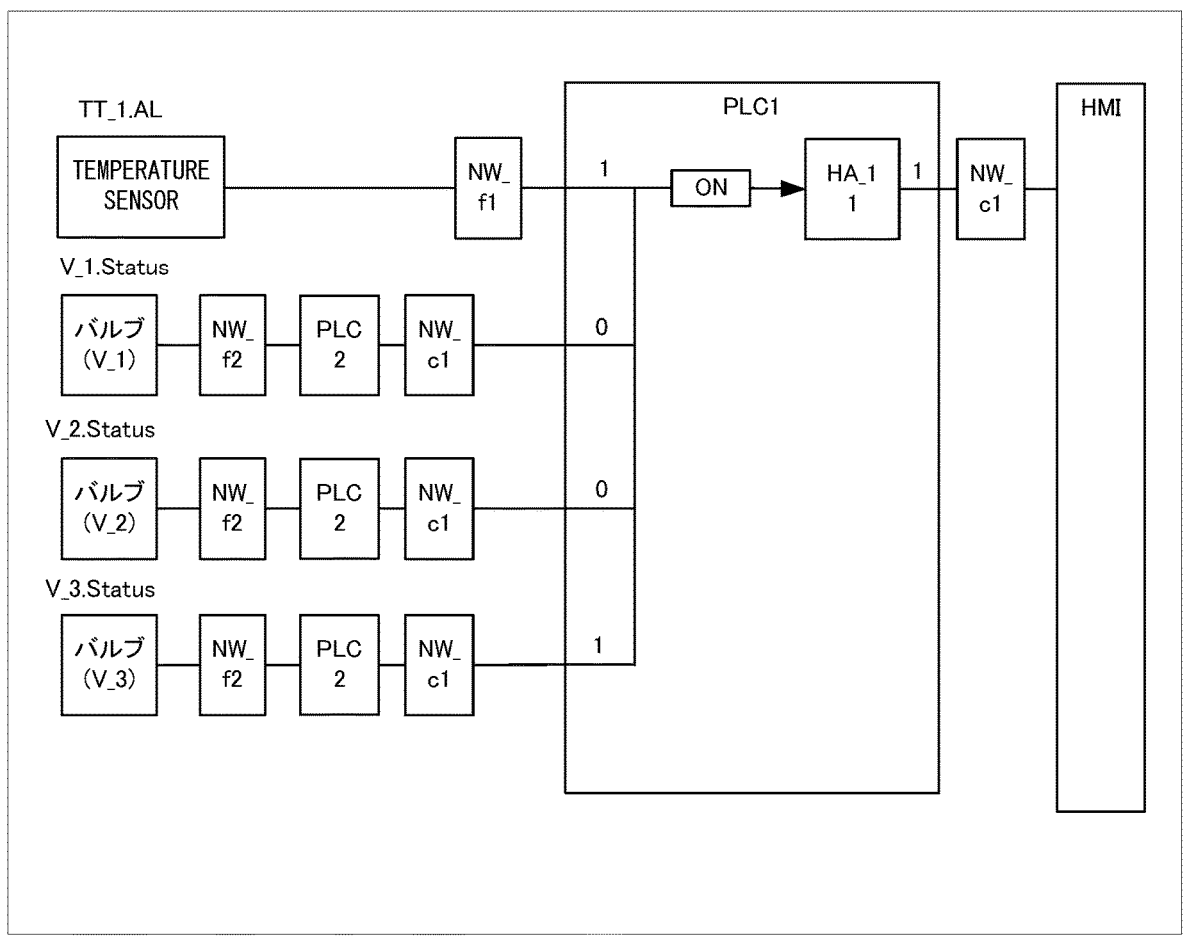
FIG. 14 illustrates a fourth example of a displayed screen in the example embodiment of the invention.

In the example in FIG. 14, the display unit 14 further displays the terminal device 34 used by the operator on the screen illustrated in FIG. 13. According to the example in FIG. 14, the operator can check the paths with which the screen that the operator is observing is constructed.

Figure 15A:
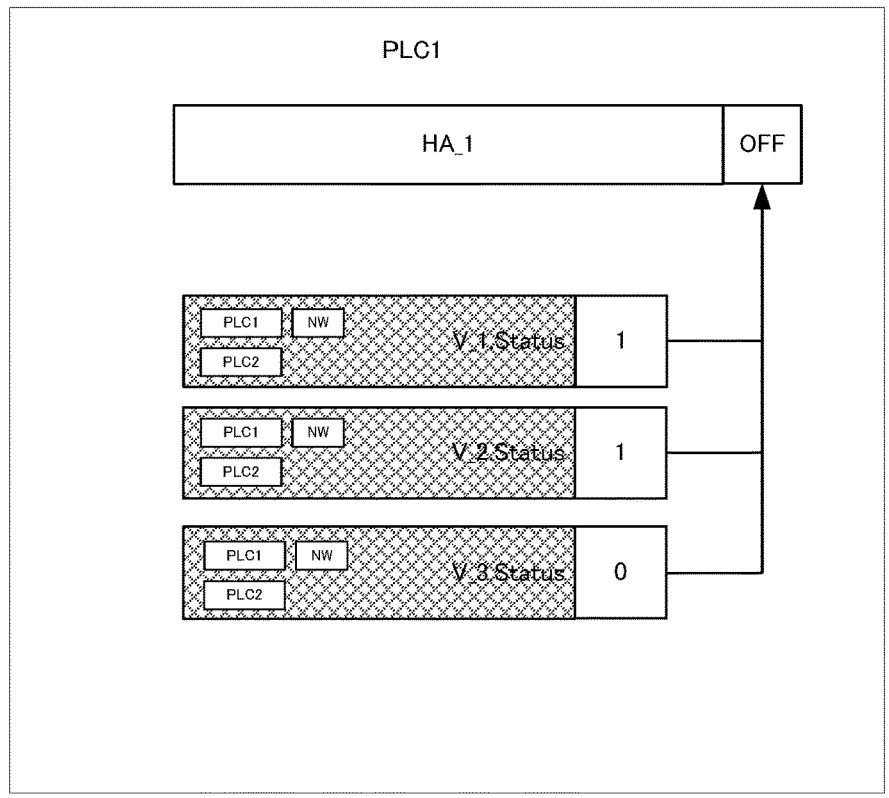
FIG. 15 illustrates a fifth example of a displayed screen in the example embodiment of the invention.
Figure 15B:
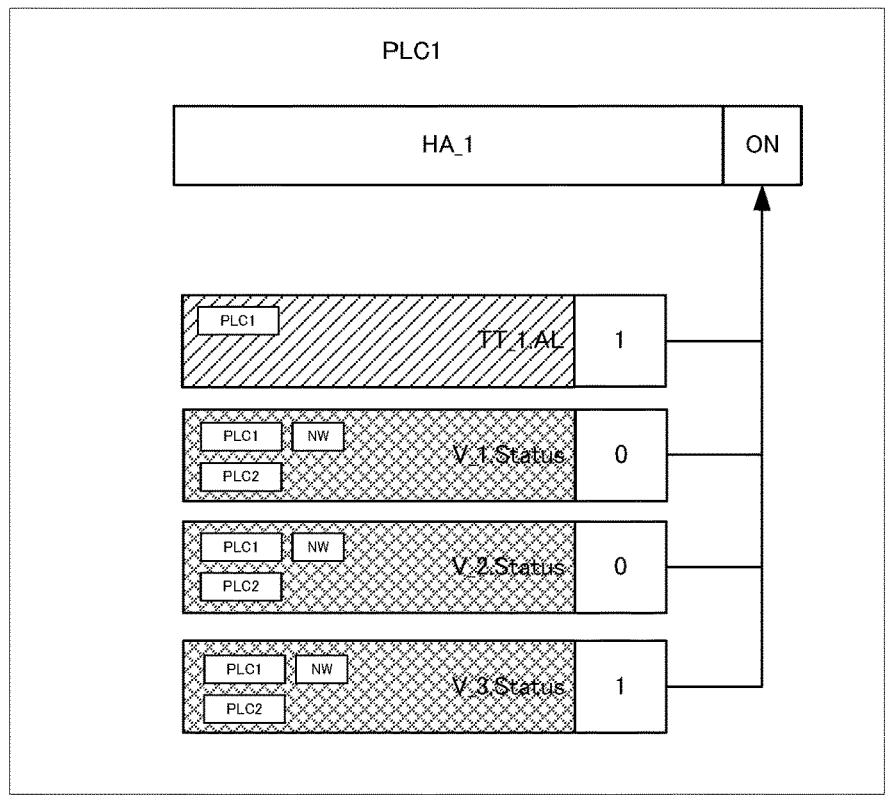

Furthermore, in the example in FIG. 15, the display unit 14 makes the background color thick for a signal for which the risk of having been tampered with is high in accordance with the risk, in order to indicate that the risk of having been tampered with is high for the corresponding signal. Here, the icon "NW" is added to the display regions of signals having passed through a specific control network (NW_c1), and the display regions are displayed with a thicker background color. FIG. 15a illustrates a display example in a case in which causal relationships R02, R04, and R05 are simultaneously specified in a state in which the heater 23 is off, and FIG. 15b illustrates a case in which causal relationship R03 is specified in a state in which the heater 23 is on. According to the example in FIG. 15, the operator can ascertain the risk of each signal.

Figure 16A:
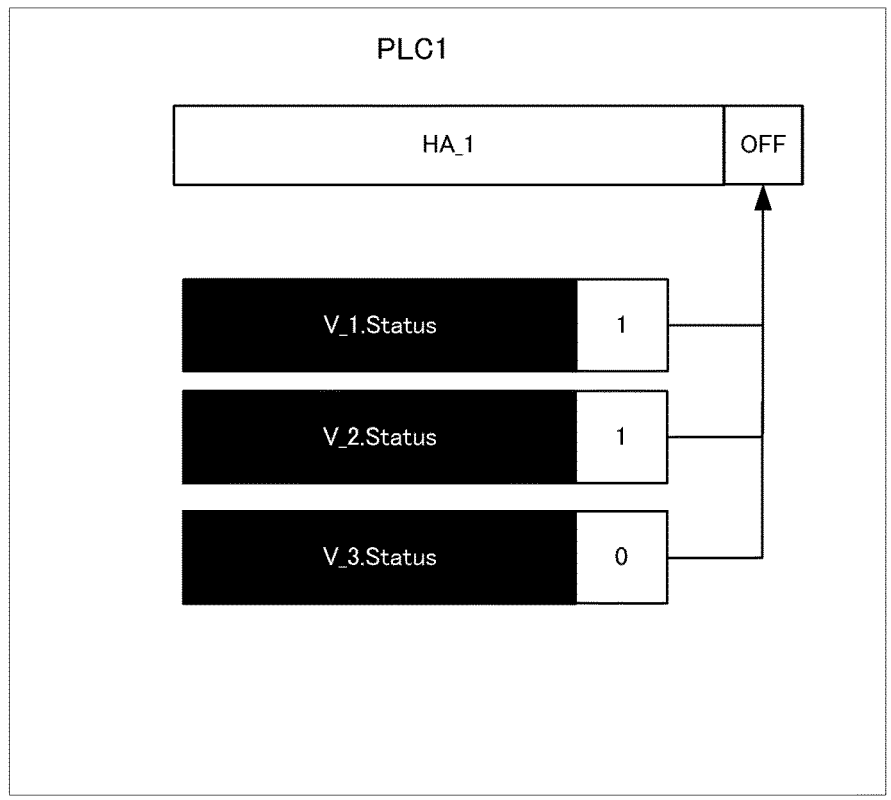
FIG. 16 illustrates a sixth example of a displayed screen in the example embodiment of the invention.
Figure 16B:
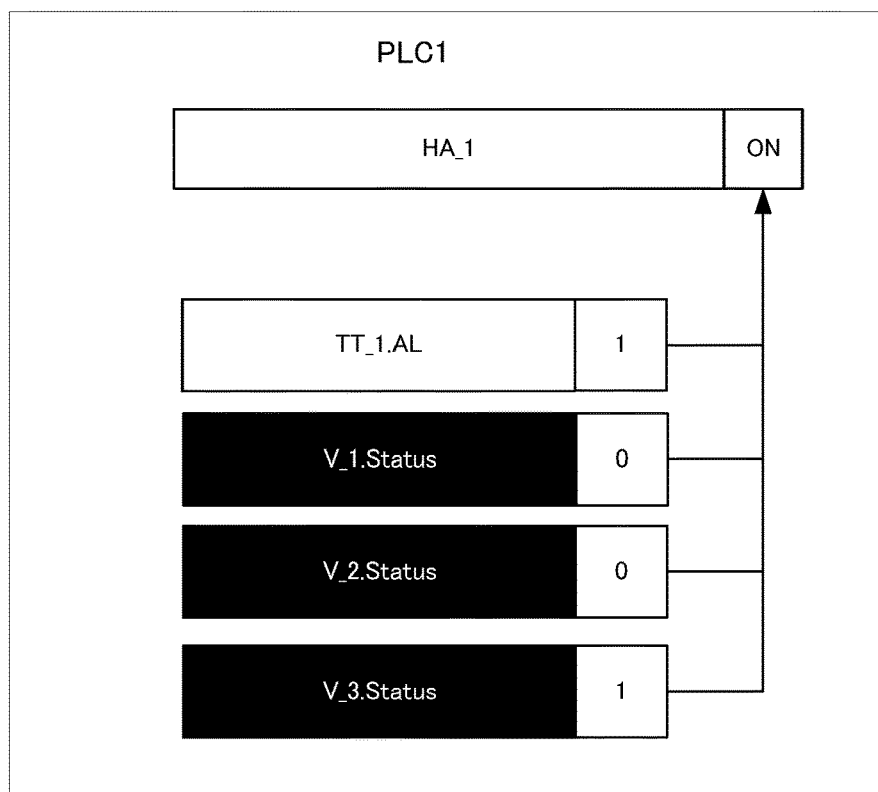

Furthermore, in the example in FIG. 16, the display unit 14 displays a signal for which the risk of having been tampered with is high in an inverted display mode, in order to indicate that the risk of having been tampered with is high for the corresponding signal. FIG. 16a illustrates a case in which causal relationships R02, R04, and R05 are simultaneously specified in a state in which the heater 23 is off, and FIG. 16b illustrates a case in which causal relationship R03 is specified in a state in which the heater 23 is on. The operator can ascertain the risk of each signal in the example in FIG. 16 as well.

[Effects of Example Embodiment]

As described above, according to the present example embodiment, a causal relationship between signals that is currently valid in the currently operating plant 20 is displayed on the screen. Accordingly, the operator can immediately check which ones of the signals from the sensors and the like are currently used as the basis for determining the signal for instructing an actuator to operate, stop, etc. When an abnormality occurs and the operator feels that the operation of an actuator is questionable, the operator, by going to the manufacturing process site where the sensors and the like causing the actuator to operate or stop are installed, etc., can check if the actual situation and the signals from the sensors and the like are consistent with one another. Thus, in the case of occurrence of a cyberattack such as that in which a signal from a sensor or the like is tampered with and an actuator is maliciously used, the operator can quickly ascertain whether or not the signal has been tampered with and take a countermeasure against the cyberattack.

Furthermore, in the present example embodiment, a signal for which the risk of having been tampered with is high, e.g., a signal that passes through a network, is displayed in a mode differing from that of other signals. Thus, the operator can check signals for which the risk of having been tampered with is high with higher priority over other signals, and can take countermeasures against cyberattacks more efficiently. In addition, according to the present example embodiment, the operator can ascertain in advance, even at normal times, the parts that are likely to become cyberattack targets.

[Program]

It suffices for the program in the present example embodiment to be a program that causes a computer to execute steps A1 to A6 illustrated in FIG. 10. By installing this program on a computer and executing the program, the plant monitoring apparatus and the plant monitoring method in the present example embodiment can be realized. In this case, the processor of the computer functions and performs processing as the control program acquisition unit 11, the causal relationship extraction unit 12, the causal relationship specification unit 13, the display unit 14, the path specification unit 15, and the system state acquisition unit 17.

Furthermore, in the present example embodiment, the causal relationship storage unit 16 and the physical configuration storage unit 18 can be realized by storing data files constituting these storage units to a storage device, such as a hard disk, included in the computer.

Also, the program in the present example embodiment may be executed by a computer system formed from a plurality of computers. In this case, the computers may each function as one of the control program acquisition unit 11, the causal relationship extraction unit 12, the causal relationship specification unit 13, the display unit 14, the path specification unit 15, and the system state acquisition unit 17, for example. The causal relationship storage unit 16 and the physical configuration storage unit 18 may be constructed on a computer separate from the computer that executes the program in the present example embodiment.

Figure 17:
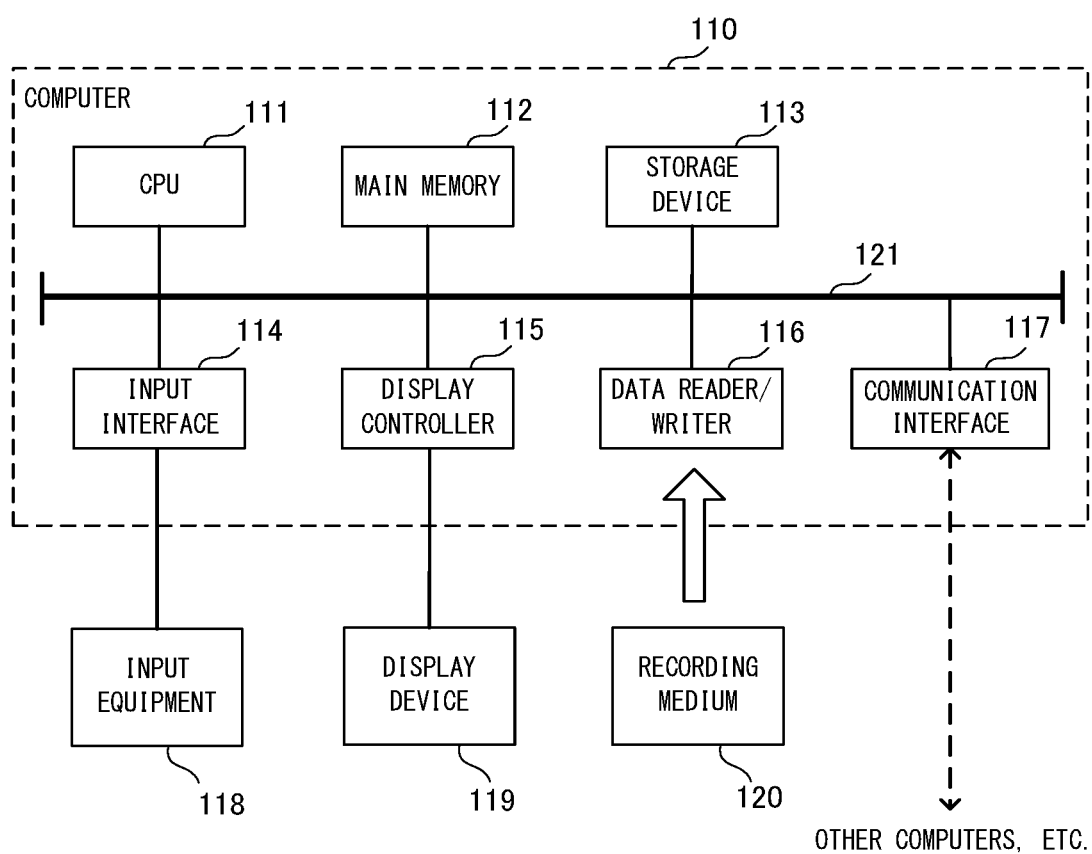
FIG. 17 is a block diagram illustrating one example of a computer realizing the plant monitoring apparatus in the example embodiment of the invention.

Here, a computer that realizes the plant monitoring apparatus 10 by executing the program in the present example embodiment will be described with reference to FIG. 17. FIG. 17 is a block diagram illustrating one example of a computer realizing the plant monitoring apparatus in the example embodiment of the invention.

As illustrated in FIG. 17, a computer 110 includes a central processing unit (CPU) 111, a main memory 112, a storage device 113, an input interface 114, a display controller 115, a data reader/writer 116, and a communication interface 117. These components are connected via a bus 121 so as to be capable of performing data communication with one another. Note that the computer 110 may include a graphics processing unit (GPU) or a field-programmable gate array (FPGA) in addition to the CPU 111 or in place of the CPU 111.

The CPU 111 loads the program (codes) in the present example embodiment, which is stored in the storage device 113, onto the main memory 112, and performs various computations by executing these codes in a predetermined order. The main memory 112 is typically a volatile storage device such as a dynamic random access memory (DRAM) or the like. Furthermore, the program in the present example embodiment is provided in a state such that the program is stored in a computer readable recording medium 120. Note that the program in the present example embodiment may also be a program that is distributed on the Internet, to which the computer 110 is connected via the communication interface 117.

In addition, specific examples of the storage device 113 include semiconductor storage devices such as a flash memory, in addition to hard disk drives. The input interface 114 mediates data transmission between the CPU 111 and input equipment 118 such as a keyboard and a mouse. The display controller 115 is connected to a display device 119, and controls the display performed by the display device 119.

The data reader/writer 116 mediates data transmission between the CPU 111 and the recording medium 120, and executes the reading of the program from the recording medium 120 and the writing of results of processing in the computer 110 to the recording medium 120. The communication interface 117 mediates data transmission between the CPU 111 and other computers.

Furthermore, specific examples of the recording medium 120 include a general-purpose semiconductor storage device such as a CompactFlash (registered trademark, CF) card or a Secure Digital (SD) card, a magnetic recording medium such as a flexible disk, and an optical recording medium such as a compact disk read-only memory (CD-ROM).

Note that the plant monitoring apparatus 10 in the present example embodiment can also be realized by using pieces of hardware corresponding to the respective units, rather than using a computer on which the program is installed. Furthermore, a part of the plant monitoring apparatus 10 may be realized by using a program and the remaining part of the plant monitoring apparatus 10 may be realized by using hardware.

While a part of or the entirety of the above-described example embodiment can be expressed by (Supplementary note 1) to (Supplementary note 12) described in the following, the invention is not limited to the following description.

(Supplementary Note 1)

A plant monitoring apparatus that is an apparatus for monitoring the operational status of a plant, including:

a control program acquisition unit configured to acquire a control program for controlling the plant on the basis of sensor data from a sensor installed in the plant;

a causal relationship extraction unit configured to extract, from the acquired control program, causal relationships between a plurality of signals that are used in the plant;

a causal relationship specification unit configured to compare the current state of the plurality of signals and each of the extracted causal relationships to specify a causal relationship corresponding to the current state; and a display unit configured to display the specified causal relationship on a screen.

(Supplementary Note 2)

The plant monitoring apparatus according to Supplementary note 1 further including a path specification unit configured to specify a source and a midway path of each of the plurality of signals included in the specified causal relationship, wherein the display unit displays, on the screen, the plurality of signals included in the specified causal relationship, and the source and the midway path that are specified, as the causal relationship.

(Supplementary Note 3)

The plant monitoring apparatus according to Supplementary note 2, wherein in a case in which the plant includes a plurality of control devices each executing the control program and networks connecting the plurality of control devices, the control program acquisition unit acquires the control program for each of the control devices, the causal relationship extraction unit, for each of the control devices, extracts the causal relationships from the control program for the control device, and the path specification unit, for each of the control devices, specifies a source and a midway path of each of the plurality of signals included in the specified causal relationship, and, if a midway path that is specified falls under at least one of: a situation in which the specified midway path includes a control device other than the control device; and a situation in which the specified midway path includes a specific network, instructs the display unit to differentiate a display mode of the corresponding signal from a display mode of the other signals.

(Supplementary Note 4)

The plant monitoring apparatus according to any one of Supplementary notes 1 to 3, wherein the causal relationship extraction unit extracts, as causal relationships between the plurality of signals used in the plant, signals that are included in assignment processing and branching conditions in conditional branch processing, and values of the signals.

(Supplementary Note 5)

A plant monitoring method that is a method for monitoring the operational status of a plant, including:

(a) a step of acquiring a control program for controlling the plant on the basis of sensor data from a sensor installed in the plant;

(b) a step of extracting, from the acquired control program, causal relationships between a plurality of signals that are used in the plant;

(c) a step of comparing the current state of the plurality of signals and each of the extracted causal relationships to specify a causal relationship corresponding to the current state; and (d) a step of displaying the specified causal relationship on a screen.

(Supplementary Note 6)

The plant monitoring method according to Supplementary note 5 further comprising (e) a step of specifying a source and a midway path of each of the plurality of signals included in the specified causal relationship, wherein in the (d) step, the plurality of signals included in the specified causal relationship, and the source and the midway path that are specified are displayed on the screen, as the causal relationship.

(Supplementary Note 7)

The plant monitoring method according to Supplementary note 6, wherein in a case in which the plant includes a plurality of control devices each executing the control program and networks connecting the plurality of control devices, in the (a) step, the control program is acquired for each of the control devices, in the (b) step, for each of the control devices, the causal relationships are extracted from the control program for the control device, and in the (e) step, for each of the control devices, a source and a midway path of each of the plurality of signals included in the specified causal relationship are specified, and, if a midway path that is specified falls under at least one of: a situation in which the specified midway path includes a control device other than the control device; and a situation in which the specified midway path includes a specific network, a display mode of the corresponding signal is differentiated from a display mode of the other signals in the step (d).

(Supplementary Note 8)

The plant monitoring method according to any one of Supplementary notes 5 to 7, wherein in the (b) step, as causal relationships between the plurality of signals used in the plant, signals that are included in assignment processing and branching conditions in conditional branch processing, and values of the signals are extracted.

(Supplementary Note 9)

A computer readable recording medium that includes recorded thereon a program for monitoring the operational status of a plant by means of a computer, the program including instructions that cause a computer to carry out (a) a step of acquiring a control program for controlling the plant on the basis of sensor data from a sensor installed in the plant;

(b) a step of extracting, from the acquired control program, causal relationships between a plurality of signals that are used in the plant;

(c) a step of comparing the current state of the plurality of signals and each of the extracted causal relationships to specify a causal relationship corresponding to the current state; and (d) a step of displaying the specified causal relationship on a screen.

(Supplementary Note 10)

The computer readable recording medium according to Supplementary note 9, wherein the program further includes instructions causing the computer to carry out (e) a step of specifying a source and a midway path of each of the plurality of signals included in the specified causal relationship, wherein in the (d) step, the plurality of signals included in the specified causal relationship, and the source and the midway path that are specified are displayed on the screen, as the causal relationship.

(Supplementary Note 11)

The computer readable recording medium according to Supplementary note 10, wherein in a case in which the plant includes a plurality of control devices each executing the control program and networks connecting the plurality of control devices, in the (a) step, the control program is acquired for each of the control devices, in the (b) step, for each of the control devices, the causal relationships are extracted from the control program for the control device, and in the (e) step, for each of the control devices, a source and a midway path of each of the plurality of signals included in the specified causal relationship are specified, and, if a midway path that is specified falls under at least one of: a situation in which the specified midway path includes a control device other than the control device; and a situation in which the specified midway path includes a specific network, a display mode of the corresponding signal is differentiated from a display mode of the other signals in the step (d).

(Supplementary Note 12)

The computer readable recording medium according to any one of Supplementary notes 9 to 11, wherein in the (b) step, as causal relationships between the plurality of signals used in the plant, signals that are included in assignment processing and branching conditions in conditional branch processing, and values of the signals are extracted.

The invention has been described with reference to an example embodiment above, but the invention is not limited to the above-described example embodiment. Within the scope of the invention, various changes that could be understood by a person skilled in the art could be applied to the configurations and details of the invention.

INDUSTRIAL APPLICABILITY

As described above, according to the invention, a causal relationship included in a control program is presented so that an operator could take a countermeasure quickly in a case in which an abnormality occurs in a plant. The invention is useful in various plants controlled by control devices.

REFERENCE SIGNS LIST

10 Plant monitoring apparatus
11 Control program acquisition unit
12 Causal relationship extraction unit
13 Causal relationship specification unit
14 Display unit
15 Path specification unit
16 Causal relationship storage unit
17 System state acquisition unit
18 Physical configuration storage unit
20 Plant
21 Water storage tank
22 Temperature sensor
23 Heater
24 Feed line
25 Lower drain line
26 Upper drain line
27-29 Valves
30, 31 PLCs
32 Network switch
33 Engineering workstation
34 Terminal device (HMI)
110 Computer
111 CPU
112 Main memory
113 Storage device
114 Input interface
115 Display controller
116 Data reader/writer
117 Communication interface
118 Input equipment
119 Display device
120 Recording medium
121 Bus

The invention claimed is:

1. A plant monitoring apparatus that is an apparatus for monitoring an operational status of a plant, comprising:
  a memory device storing instructions; and
  a processor configured to execute the instructions to implement:
    a control program acquisition unit configured to acquire a control program for controlling the plant on the basis of sensor data from a sensor installed in the plant;
    a causal relationship extraction unit configured to extract, from the acquired control program, causal relationships between a plurality of signals that are used in the plant;
    a causal relationship specification unit configured to compare a current state of the plurality of signals and each of the extracted causal relationships to specify a causal relationship corresponding to the current state; and
    a display unit configured to control a display of the specified causal relationship on a screen,
  wherein in a case in which the plant includes a plurality of control devices each executing the control program and networks connecting the plurality of control devices:
    the control program acquisition unit acquires the control program for each of the control devices, and
    the causal relationship extraction unit, for each of the control devices, extracts the causal relationships from the control program,
  wherein the processor is further configured to execute the instructions to implement a path specification unit configured to specify a source and a midway path of each of the plurality of signals included in the specified causal relationship, wherein
    the display unit further controls a display of, on the screen, the plurality of signals included in the specified causal relationship, and the source and the midway path that are specified, as the causal relationship, and in the case in which the plant includes the plurality of control devices each executing the control program and networks connecting the plurality of control devices, the path specification unit, for each of the control devices, specifies a source and a midway path of each of the plurality of signals included in the specified causal relationship, and, if a midway path that is specified falls under at least one of: a situation in which the specified midway path include one of the control devices other than the control device; and a situation in which the specified midway path includes a specific network, instructs the display unit to differentiate a display mode of the corresponding signal from a display mode of the other signals.

2. The plant monitoring apparatus according to claim 1, wherein
the causal relationship extraction unit extracts, as causal relationships between the plurality of signals used in the plant, signals that are included in assignment processing and branching conditions in conditional branch processing, and values of the signals.

3. A plant monitoring method implemented by a processor and for monitoring an operational status of a plant, comprising:
acquiring a control program for controlling the plant on the basis of sensor data from a sensor installed in the plant;
extracting, from the acquired control program, causal relationships between a plurality of signals that are used in the plant;
comparing a current state of the plurality of signals and each of the extracted causal relationships to specify a causal relationship corresponding to the current state; and
controlling a display of the specified causal relationship on a screen;
in a case in which the plant includes a plurality of control devices each executing the control program and networks connecting the plurality of control devices:
acquiring the control program for each of the control devices; and
extracting, for each of the control devices, the causal relationships from the control program;
wherein the plant monitoring method further comprises specifying a source and a midway path of each of the plurality of signals included in the specified causal relationship, wherein
in the controlling the display, the plurality of signals included in the specified causal relationship, and the source and the midway path that are specified are displayed on the screen, as the causal relationship, and
in the case in which the plant includes the plurality of control devices each executing the control program and networks connecting the plurality of control devices, in the specifying, for each of the control devices, a source and a midway path of each of the plurality of signals included in the specified causal relationship are specified, and, if a midway path that is specified falls under at least one of: a situation in which the specified midway path includes one of the control devices other than the control device; and a situation in which the specified midway path includes a specific network, a display mode of the corresponding signal is differentiated from a display mode of the other signals in the displaying.

4. The plant monitoring method according to claim 3, wherein
in the extracting, as causal relationships between the plurality of signals used in the plant, signals that are included in assignment processing and branching conditions in conditional branch processing, and values of the signals are extracted.

5. A non-transitory computer readable recording medium that includes recorded thereon a program for monitoring an operational status of a plant by means of a computer,
the program including instructions that cause a computer to carry out by a processor:
acquiring a control program for controlling the plant on the basis of sensor data from a sensor installed in the plant;
extracting, from the acquired control program, causal relationships between a plurality of signals that are used in the plant;
comparing a current state of the plurality of signals and each of the extracted causal relationships to specify a causal relationship corresponding to the current state;
controlling a display of the specified causal relationship on a screen; and
in a case in which the plant includes a plurality of control devices each executing the control program and networks connecting the plurality of control devices:
acquiring the control program for each of the control devices; and
extracting, for each of the control devices, the causal relationships from the control program,
wherein the program further includes instructions causing the computer to carry out specifying a source and a midway path of each of the plurality of signals included in the specified causal relationship, wherein
in the controlling the display, the plurality of signals included in the specified causal relationship, and the source and the midway path that are specified are displayed on the screen, as the causal relationship,
in the case in which the plant includes the plurality of control devices each executing the control program and networks connecting the plurality of control devices, and
in the specifying, for each of the control devices, a source and a midway path of each of the plurality of signals included in the specified causal relationship are specified, and, if a midway path that is specified falls under at least one of: a situation in which the specified midway path includes one of the control devices other than the control device; and a situation in which the specified midway path includes a specific network, a display mode of the corresponding signal is differentiated from a display mode of the other signals in the displaying.

6. The non-transitory computer readable recording medium according to claim 5, wherein
in the extracting, as causal relationships between the plurality of signals used in the plant, signals that are included in assignment processing and branching conditions in conditional branch processing, and values of the signals are extracted.

* * * * *